Nov. 19, 1929.  F. A. APGAR  1,735,988
ART OF REFINING HYDROCARBONS
Filed March 10, 1928
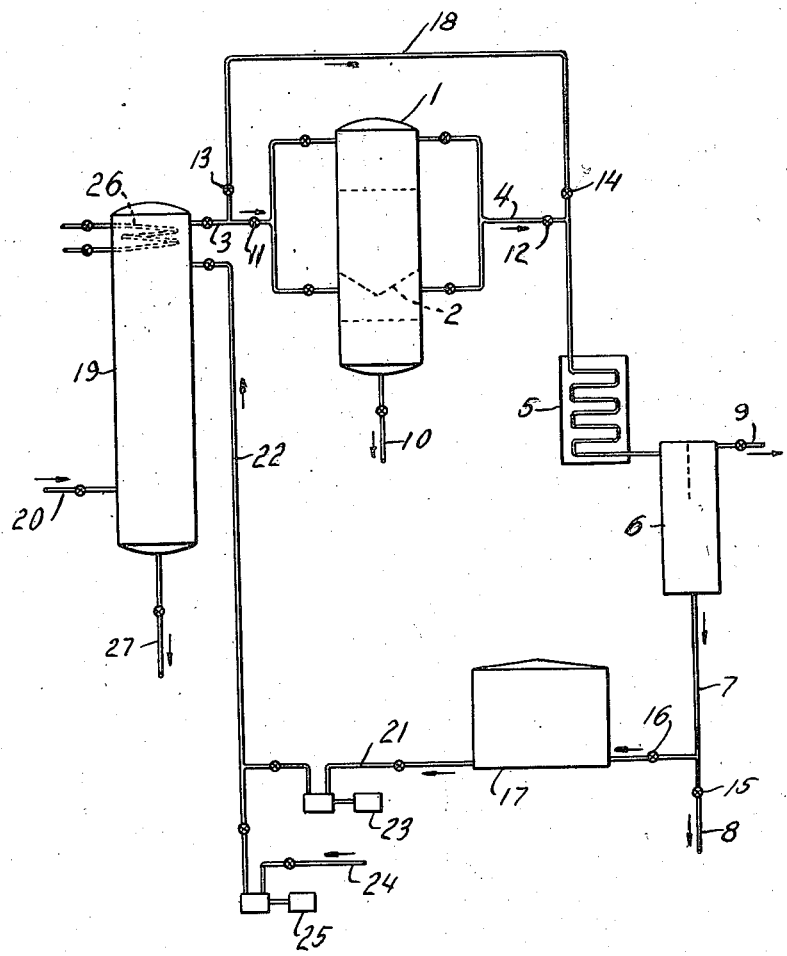
INVENTOR
Frank A. Apgar
BY
Rector, Hibben, Davis + Macauley
ATTORNEYS Patented Nov. 19, 1929

1,735,988

UNITED STATES PATENT OFFICE

FRANK A. APGAR, OF EAST CHICAGO, INDIANA, ASSIGNOR TO SINCLAIR REFINING COMPANY, OF NEW YORK, N. Y., A CORPORATION OF MAINE

ART OF REFINING HYDROCARBONS

Application filed March 10, 1928. Serial No. 260,799.

This invention relates to improvements in the vapor phase refining of hydrocarbons and hydrocarbon mixtures; and more particularly relates to improvements in refining operations in which hydrocarbon vapors are passed in contact with an adsorptive catalyst such as fuller's earth to separate, by adsorption or polymerization or otherwise, constituents not suitable as components of the refined product.

When hydrocarbon vapors including certain types of unsaturated compounds, for example the di-olefines, are passed in contact with fuller's earth or similar adsorptive catalysts, a polymerization of these unsaturated compounds takes place with resulting formation of polymers of boiling point higher than that of the original compound. This makes possible a separation of such constituents, undesirable as components of the refined product without separation of other unsaturated constituents suitable as components of such products, and the several advantages of this general method of refining hydrocarbon vapors have made it of considerable practical importance, in the refining of motor fuel gasoline in particular. As applied to gasoline, this general method makes possible the removal of constituents rendering the product unstable, of bad color or bad odor without removal of unsaturated constituents of special value in the product, such as those which have anti-knock properties.

As commonly practiced, this general method has involved charging of a suitable receptacle with a batch of adsorptive catalyst, passing the hydrocarbon vapors through this receptacle in contact with the adsorptive catalyst until the catalyst has lost its effectiveness, discharging the spent adsorptive catalyst, replacing the discharged material with a fresh charge of the adsorptive catalyst, and so on. The adsorptive catalyst as initially supplied to the operation, however, is highly active, much more active than it is during the major part of the operation. This high initial activity and the subsequent decrease in activity of the adsorptive catalyst involved several difficulties. In particular, it makes it difficult to avoid over-treatment of the hydrocarbon vapors passed in contact with the adsorptive catalyst when fresh, with consequent losses, it makes it difficult to maintain uniform operating conditions and it makes it difficult to secure a uniform product.

The initial activity of the adsorptive catalyst induces over-treatment in at least two ways. The initial activity itself tends to cause over-treatment. In addition, the polymerization reaction is exothermic and as a consequence the tendency toward increase in the reaction rate involves a tendency toward temperature increase. This in turn tends to increase the rate at which the reaction proceeds. This tendency toward over-treatment has peculiar disadvantages in the treatment of motor fuel gasoline.

In the treatment of hydrocarbon vapors including gasoline components produced by vapor phase cracking, for example, the temperature increase on passage through a body of fresh fuller's earth may amount to as much as 100° F. or more, and this increase in temperature is usually accompanied by an increase in the color of the hydrocarbon vapors escaping from the fuller's earth treatment. In the case of hydrocarbon vapor mixtures which have been fractionated to some definite end boiling point, this end boiling point is usually substantially elevated. Apparently, these undesirable effects upon the character of the escaping product are due to vaporization of polymers formed by the action of the fuller's earth with consequent contamination of the escaping vapor mixture. Further, over-treatment tends to cause losses in the separation and removal of constituents suitable and desirable as components of the motor fuel product.

This invention provides an improved method of operation which reduces to a minimum difficulties due to variations in the activity of the adsorptive catalysts used in this type of refining operation. The advantages of the invention include improvement in uniformity of operation, improvement in uniformity of product, and improved economy with respect to the adsorptive catalyst used.

According to the present invention, during those periods when the refining operation is interrupted to discharge the spent adsorptive catalyst and to replace the discharged material with fresh material, the hydrocarbon vapors normally passed through the refining operation are condensed and separately collected and such separately collected untreated hydrocarbons are passed through the adsorptive catalyst in addition to the hydrocarbon vapors normally passed therethrough when the refining operation is resumed after the interruption and during the following period of high initial activity of the fresh adsorptive catalyst supplied to the refining operation during the interruption. This addition of such separately collected hydrocarbons to the hydrocarbon vapors normally passed through the adsorptive catalyst during the period of high initial activity of the adsorptive catalyst increases the velocity of flow of the vapor mixture through the adsorptive catalyst and thereby decreases the time of contact between the vapors, and the adsorptive catalyst during this period, thus counteracting the high initial activity of the adsorptive catalyst and avoiding overtreatment of the hydrocarbon vapors and consequent losses. The operation itself is also made more uniform and a more uniform product is secured. The condensed untreated hydrocarbons separately collected during such periods of interruption are thus utilized to improve the refining operation and at the same time are subjected to refining treatment in a particularly advantageous manner. The separately collected untreated hydrocarbons are, with advantage, introduced into a fractionating operation through which the hydrocarbon vapors are passed on their way to the refining operation, being thereby revaporized and at the same time assisting in cooling the vapors in the fractionating operation. The fractionating operation may be controlled to accommodate the variable rate at which such separately collected untreated hydrocarbons are supplied.

The invention will be further described in connection with the accompanying drawings which illustrate, diagrammatically and conventionally, in elevation, apparatus adapted for carrying out the invention, but it is intended, and will be understood that this more detailed description and illustration of the invention is by way of exemplification.

Referring to the drawings, the refining operation proper is carried out in the tower 1 in which a charge of the adsorptive catalyst, for example, fuller's earth of 40–60 or 60–80 mesh, is supported upon a foraminous partition 2. The hydrocarbon vapors to be refined are supplied through connection 3, passed through the charge of the adsorptive catalyst in the tower 1 either upwardly or downwardly and discharged through connection 4 to the condenser 5. In normal operation, the hydrocarbon vapors passed through the refining tower 1 to the condenser 5 are condensed in the condenser 5, the condensate is separated from uncondensed vapors and gases in receiver 6, the condensed refined product is discharged through connections 7 and 8, uncondensed vapors and gases are discharged through connection 9, and high boiling polymers and any other material liquefied in the tower 1 are discharged through connection 10.

When the charge of the adsorptive catalyst in the refining tower 1 has lost its effectiveness, valves 11 and 12 are closed and valves 13 and 14 are opened to by-pass through connection 18 to the condenser 5 the hydrocarbon vapors normally passed through the refining tower, and at the same time the valve 15 is closed and the valve 16 is opened so that the condensed untreated hydrocarbons are separately collected in the tank 17 during this interruption of the refining operation. The spent adsorptive catalyst is then discharged from the refining tower and the discharged material replaced with a fresh charge of the adsorptive catalyst. As soon as the fresh adsorptive catalyst has been supplied to the refining tower, valves 13 and 14 are closed and valves 11 and 12 are opened to resume passage of the hydrocarbon vapors through the refining tower 1, and valve 16 is closed and valve 15 is opened to resume discharge of the refined product through connection 8. During the period of high initial activity of the adsorptive catalyst following resumption of the refining operation, untreated hydrocarbons collected in tank 17 are passed through the refining tower 1 in addition to the hydrocarbon vapors normally passed therethrough. As the high initial activity of the adsorptive catalyst diminishes, the proportion of such separately collected untreated hydrocarbons supplied to the refining operation in addition to the hydrocarbon vapors normally passed therethrough may be diminished or the supply of such separately collected untreated hydrocarbons may be stopped. The rate at which such separately collected untreated hydrocarbons are supplied to the refining operation may be regulated progressively to decrease the velocity of vapor travel through the refining tower 1 as the activity of the adsorptive catalyst decreases, or such separately collected untreated hydrocarbons may be supplied to the refining operation during the initial period of the refining operation while the adsorptive catalyst is highly active and this supply of separately collected untreated hydrocarbons stopped after the high initial activity of the adsorptive catalyst has passed.

In usual practice, the period of interruption of the refining operation necessary to discharge the spent adsorptive catalyst and to replace the discharged material with fresh material is much shorter than the following period during which the refining operation is resumed and the period of high initial activity of the fresh adsorptive catalyst corresponds approximately with the period of interruption, so that usually the amount of untreated hyrocarbons separately collected during the period of interruption approximates quite closely the amount necessary to be supplied to the refining operation in addition to the hydrocarbon vapors normally passed therethrough during the initial period of the refining operation while the activity of the fresh adsorptive catalyst supplied during the interruption is high when the refining operation is resumed.

In carrying out the invention in the apparatus illustrated, the hydrocarbon vapors supplied to the refining operation through connection 3 are first passed through the fractionating tower 19 in which higher boiling constituents of the vapor mixture supplied through connection 20 are condensed, and the separately collected condensed untreated hydrocarbons supplied to the refining operation in addition to the hydrocarbon vapors normally passed therethrough during the period of high initial activity following the supply of fresh adsorptive catalyst to the refining operation are introduced into the upper end of this fractionating tower from tank 17 through connections 21 and 22 by means of pump 23. In the fractionating tower 19, the condensed untreated hydrocarbons so introduced are revaporized by heat exchange with the vapors in the fractionating tower to escape in admixture with the uncondensed vapors from the fractionating tower. This vaporization at the same time assists in cooling the vapors in the fractionating tower. The supply of condensed untreated hydrocarbons from tank 17 is regulated with respect to the activity of the adsorptive catalyst in the refining operation; as this regulation would introduce a variable factor into the fractionating operation, the refluxing action of the condensed untreated hydrocarbons so supplied to the upper end of the fractionating tower is supplemented by some other suitable refluxing control, for example, by the direct introduction of some other refluxing medium through connections 24 and 22 by means of pump 25 or by circulation of water or cool oil through cooling coil 26, and this other refluxing control is regulated to maintain uniform the fractionating operation. For example, in operations to produce gasoline, a gasoline fraction to be blended with the gasoline product and relatively inert with respect to the adsorptive catalyst in the refining operation may be supplied through connections 24 and 22 at a rate regulated with respect to the supply of condensed untreated material through connections 21 and 22 to equalize the refluxing effect in the fractionating tower 19. A separate alternative refluxing medium may be supplied through connections 24 and 22, for example, while the supply of condensed untreated hydrocarbons through connections 21 and 22 is stopped, or such separate refluxing medium may be supplied through connections 24 and 22 at a rate increasing and decreasing with decrease and increase, respectively, of the rate at which such condensed untreated hydrocarbons are supplied through connections 21 and 22. Material liquefied in the fractionating tower 19 is discharged through connection 27.

It will be understood that the cycle of operations just described is repeated as successive charges of the adsorptive catalyst lose their effectiveness, are discharged and the discharged material replaced with fresh charges of the adsorptive catalyst.

I claim:

1. In the vapor phase refining of hydrocarbons by passage of the hydrocarbon vapors through a charge of an adsorptive catalyst, the improvement which comprises interrupting the refining operation from time to time to supply fresh catalyst thereto and, during the period of interruption, condensing and separately collecting untreated hydrocarbons normally passed through the catalyst, and passing such separately collected hydrocarbons as vapors through the catalyst in addition to the vapors normally passed therethrough upon resuming the refining operation after the period of interruption and during the period of high initial activity of fresh catalyst supplied to the operation.

2. In the vapor phase refining of hydrocarbons, the improvement which comprises passing the hydrocarbon vapors successively through a fractionating operation and an adsorptive catalyst, interrupting the refining operation from time to time to supply fresh catalyst and, during the period of interruption, condensing and separately collecting untreated hydrocarbons normally passed through the catalyst, and introducing such separately collected hydrocarbons into the vapors in the fractionating operation upon resuming the refining operation after the period of interruption and during the period of high initial activity of fresh catalyst supplied to the operation, whereby such separately collected hydrocarbons are vaporized and passed through the catalyst in admixture with the vapors normally passed therethrough.

In testimony whereof, I have subscribed my name.

FRANK A. APGAR.